United States Patent
Derelöv et al.

(10) Patent No.: US 11,680,595 B2
(45) Date of Patent: Jun. 20, 2023

(54) RAIL FOR CABINETS

(71) Applicant: Välinge Innovation AB, Viken (SE)

(72) Inventors: Peter Derelöv, Viken (SE); Hans Brännström, Höganäs (SE)

(73) Assignee: VALINGE INNOVATION AB, Viken (SE)

(*) Notice: Subject to any disclaimer, the term of this patent is extended or adjusted under 35 U.S.C. 154(b) by 0 days.

(21) Appl. No.: 17/546,356

(22) Filed: Dec. 9, 2021

(65) Prior Publication Data

US 2022/0186761 A1  Jun. 16, 2022

(30) Foreign Application Priority Data

Dec. 11, 2020 (SE) ..................... 2051447-7

(51) Int. Cl.
  F16B 9/00 (2006.01)
  A47B 77/08 (2006.01)
  A47B 77/06 (2006.01)

(52) U.S. Cl.
  CPC ............... *F16B 9/09* (2018.08); *A47B 77/06* (2013.01); *A47B 77/08* (2013.01)

(58) Field of Classification Search
  CPC . F16B 9/09; A47B 77/06; A47B 77/08; A47B 57/48; A47B 57/482; A47B 57/50; A47B 47/027; A47B 47/0058; E03C 1/33
  See application file for complete search history.

(56) References Cited

U.S. PATENT DOCUMENTS

| | | | | |
|---|---|---|---|---|
| 7,429,021 B2 * | 9/2008 | Sather | ...... | E03C 1/33 248/200.1 |
| 8,070,110 B2 * | 12/2011 | Jones | ...... | E03C 1/33 248/200.1 |
| 8,356,367 B2 * | 1/2013 | Flynn | ...... | E03C 1/33 248/500 |

(Continued)

OTHER PUBLICATIONS

U.S. Appl. No. 15/642,757, Peter Derelöv, filed Jul. 6, 2017. (Cited herein as US Patent Application Publication No. 2017/0298973 A1 of Oct. 19, 2017).

(Continued)

*Primary Examiner* — Matthew W Ing
(74) *Attorney, Agent, or Firm* — Buchanan Ingersoll & Rooney P.C.

(57) ABSTRACT

A locking rail for locking of a first and a second panel horizontally. The panels each include an essentially vertical panel surface and an essentially horizontal edge surface. The locking rail includes a first and a second locking device which are configured to engage the edge surface of the first and the second panel, respectively, and an interconnecting extension which extends between said first and second locking device. The first and second locking device each includes a first locking tongue which extends essentially perpendicular to the interconnecting extension. The first locking tongue of the first locking device is configured for locking of the first panel in a first horizontal direction and the first locking tongue of the second locking device is configured for locking of the second panel in the first horizontal direction. The locking rail includes a first locking part which extends essentially perpendicular to the interconnecting extension.

15 Claims, 10 Drawing Sheets

(56) References Cited

U.S. PATENT DOCUMENTS

| | | | |
|---|---|---|---|
| 8,443,992 B2* | 5/2013 | Lawson | A47B 47/028 211/187 |
| 8,887,468 B2 | 11/2014 | Håkansson et al. | |
| 9,375,085 B2 | 6/2016 | Derelöv | |
| 9,538,842 B2 | 1/2017 | Håkansson et al. | |
| 9,655,442 B2 | 5/2017 | Boo et al. | |
| 9,714,672 B2 | 7/2017 | Derelöv et al. | |
| 9,723,923 B2 | 8/2017 | Derelöv | |
| 9,726,210 B2 | 8/2017 | Derelöv et al. | |
| 9,945,121 B2 | 4/2018 | Derelöv | |
| 10,034,541 B2 | 7/2018 | Boo et al. | |
| 10,202,996 B2 | 2/2019 | Håkansson et al. | |
| 10,415,613 B2 | 9/2019 | Boo | |
| 10,448,739 B2 | 10/2019 | Derelöv et al. | |
| 10,451,097 B2 | 10/2019 | Brännström et al. | |
| 10,451,293 B2* | 10/2019 | Kobos | A47B 77/022 |
| 10,486,245 B2 | 11/2019 | Fridlund | |
| 10,506,875 B2 | 12/2019 | Boo et al. | |
| 10,544,818 B2 | 1/2020 | Fridlund | |
| 10,548,397 B2 | 2/2020 | Derelöv et al. | |
| 10,669,716 B2 | 6/2020 | Derelöv | |
| 10,670,064 B2 | 6/2020 | Derelöv | |
| 10,724,564 B2 | 7/2020 | Derelöv | |
| 10,731,688 B2 | 8/2020 | Brännström et al. | |
| 10,736,416 B2 | 8/2020 | Derelöv et al. | |
| 10,745,198 B1* | 8/2020 | Iellimo | B65G 1/04 |
| 10,830,266 B2 | 11/2020 | Fridlund | |
| 10,830,268 B2 | 11/2020 | Boo | |
| 10,871,179 B2 | 12/2020 | Håkansson et al. | |
| 10,876,562 B2 | 12/2020 | Pervan | |
| 10,876,563 B2 | 12/2020 | Derelöv et al. | |
| 10,968,936 B2 | 4/2021 | Boo et al. | |
| 11,076,691 B2 | 8/2021 | Boo | |
| 11,083,287 B2 | 8/2021 | Boo et al. | |
| 11,098,484 B2 | 8/2021 | Derelöv | |
| 11,137,007 B2 | 10/2021 | Fridlund | |
| 11,204,051 B2 | 12/2021 | Brännström et al. | |
| 11,246,415 B2 | 2/2022 | Derelöv et al. | |
| 11,272,783 B2 | 3/2022 | Derelöv | |
| 11,326,636 B2 | 5/2022 | Pervan | |
| 2004/0194253 A1* | 10/2004 | Jung | F25D 23/02 16/87.2 |
| 2012/0279161 A1 | 11/2012 | Håkansson et al. | |
| 2015/0035422 A1 | 2/2015 | Håkansson et al. | |
| 2015/0078807 A1 | 3/2015 | Brännström et al. | |
| 2015/0078819 A1 | 3/2015 | Derelöv et al. | |
| 2015/0196118 A1 | 7/2015 | Derelöv | |
| 2015/0198191 A1 | 7/2015 | Boo | |
| 2016/0007751 A1 | 1/2016 | Derelöv | |
| 2016/0174704 A1 | 6/2016 | Boo et al. | |
| 2016/0270531 A1 | 9/2016 | Derelöv | |
| 2017/0079433 A1 | 3/2017 | Derelöv et al. | |
| 2017/0089379 A1 | 3/2017 | Pervan | |
| 2017/0097033 A1 | 4/2017 | Håkansson et al. | |
| 2017/0159291 A1 | 6/2017 | Derelöv | |
| 2017/0208938 A1 | 7/2017 | Derelöv et al. | |
| 2017/0227031 A1 | 8/2017 | Boo | |
| 2017/0227032 A1 | 8/2017 | Fridlund | |
| 2017/0227035 A1 | 8/2017 | Fridlund | |
| 2017/0234346 A1 | 8/2017 | Fridlund | |
| 2017/0298973 A1 | 10/2017 | Derelöv | |
| 2017/0360193 A1 | 12/2017 | Boo et al. | |
| 2018/0080488 A1 | 3/2018 | Derelöv | |
| 2018/0087552 A1 | 3/2018 | Derelöv et al. | |
| 2018/0112695 A1 | 4/2018 | Boo et al. | |
| 2018/0119717 A1 | 5/2018 | Derelöv | |
| 2018/0202160 A1 | 7/2018 | Derelöv | |
| 2018/0328396 A1 | 11/2018 | Fransson et al. | |
| 2019/0113061 A1 | 4/2019 | Håkansson et al. | |
| 2019/0166989 A1 | 6/2019 | Boo et al. | |
| 2019/0191870 A1 | 6/2019 | Derelöv | |
| 2019/0195256 A1 | 6/2019 | Derelöv | |
| 2019/0289999 A1 | 9/2019 | Derelöv et al. | |
| 2019/0320793 A1 | 10/2019 | Boo | |
| 2019/0323532 A1 | 10/2019 | Boo | |
| 2019/0323533 A1 | 10/2019 | Boo | |
| 2019/0323534 A1 | 10/2019 | Derelöv | |
| 2019/0323535 A1 | 10/2019 | Derelöv | |
| 2020/0003242 A1 | 1/2020 | Brännström et al. | |
| 2020/0055126 A1 | 2/2020 | Fridlund | |
| 2020/0069048 A1 | 3/2020 | Derelöv et al. | |
| 2020/0069049 A1 | 3/2020 | Derelöv et al. | |
| 2020/0102978 A1 | 4/2020 | Fridlund | |
| 2020/0121076 A1 | 4/2020 | Derelöv et al. | |
| 2020/0214447 A1 | 7/2020 | Derelöv et al. | |
| 2020/0300284 A1 | 9/2020 | Pervan | |
| 2020/0337455 A1 | 10/2020 | Boo et al. | |
| 2020/0340513 A1 | 10/2020 | Derelöv | |
| 2021/0079650 A1 | 3/2021 | Derelöv | |
| 2021/0148392 A1 | 5/2021 | Brännström et al. | |
| 2021/0180630 A1 | 6/2021 | Bruno et al. | |
| 2021/0190112 A1 | 6/2021 | Derelöv | |
| 2021/0207635 A1 | 7/2021 | Håkansson et al. | |
| 2021/0222716 A1 | 7/2021 | Derelöv et al. | |
| 2021/0262507 A1 | 8/2021 | Svensson et al. | |
| 2021/0262508 A1 | 8/2021 | Svensson et al. | |
| 2021/0276108 A1 | 9/2021 | Derelöv et al. | |
| 2021/0285480 A1 | 9/2021 | Derelöv et al. | |
| 2021/0381251 A1 | 12/2021 | Svensson | |
| 2022/0018373 A1 | 1/2022 | Boo | |
| 2022/0049735 A1 | 2/2022 | Meijer | |

OTHER PUBLICATIONS

U.S. Appl. No. 15/956,949, Peter Derelöv, filed Apr. 19, 2018. (Cited herein as US Patent Application Publication No. 2019/0323535 A1 of Oct. 24, 2019).

U.S. Appl. No. 15/978,630, Jonas Fransson, Niclas Håkansson and Agne Pålsson, filed May 14, 2018. (Cited herein as US Patent Application Publication No. 2018/0328396 A1 of Nov. 15, 2018).

U.S. Appl. No. 16/220,574, Peter Derelöv, filed Dec. 14, 2018. (Cited herein as US Patent Application Publication No. 2019/0195256 A1 of Jun. 27, 2019).

U.S. Appl. No. 16/386,874, Peter Derelöv, filed Apr. 17, 2019. (Cited herein as US Patent Application Publication No. 2019/0323534 A1 of Oct. 24, 2019).

U.S. Appl. No. 16/663,603, Magnus Fridlund, filed Oct. 25, 2019. (Cited herein as US Patent Application Publication No. 2020/0055126 A1 of Feb. 20, 2020).

U.S. Appl. No. 16/722,096, Peter Derelöv and Christian Boo, filed Dec. 20, 2019. (Cited herein as US Patent Application Publication No. 2020/0121076 A1 of Apr. 23, 2020).

U.S. Appl. No. 16/951,394, Niclas Håkansson and Darko Pervan, filed Nov. 18, 2020. (Cited herein as US Patent Application Publication No. 2021/0207635 A1 of Jul. 8, 2021).

U.S. Appl. No. 16/953,608, Peter Derelöv, Hans Brännström and Agne Pålsson, filed Nov. 20, 2020. (Cited herein as US Patent Application Publication No. 2021/0285480 A1 of Sep. 16, 2021).

U.S. Appl. No. 17/119,392, Jimmie Bruno and Zoran Simunic, filed Dec. 11, 2020. (Cited herein as US Patent Application Publication No. 2021/0180630 A1 of Jun. 17, 2021).

U.S. Appl. No. 17/126,518, Peter Derelöv, filed Dec. 18, 2020. (Cited herein as US Patent Application Publication No. 2021/0190112 A1 of Jun. 24, 2021).

U.S. Appl. No. 17/398,416, Thomas Meijer, filed Aug. 10, 2021. (Cited herein as US Patent Application Publication No. 2022/0049735 A1 of Feb. 17, 2022).

U.S. Appl. No. 17/514,055, Marko Sostar, filed Oct. 29, 2021.

U.S. Appl. No. 17/524,293, Hans Brännström, Agne Pålsson and Peter Derelöv, filed Nov. 11, 2021.

U.S. Appl. No. 17/556,146, Christian Boo, filed Dec. 20, 2021.

U.S. Appl. No. 17/665,160, Oscar Rydsjö, Marko Sostar and Patrik Carlsson, filed Feb. 4, 2022.

Sostar, Marko, U.S. Appl. No. 17/514,055 entitled "Set of Panels, A Method for Assembly of the Same, and a Locking Device for a Furniture Product," filed Oct. 29, 2021.

Brännström, Hans, et al., U.S. Appl. No. 17/524,293 entitled "Assembled Product and a Method of Assembling the Assembled Product," filed Nov. 11, 2021.

(56) References Cited

OTHER PUBLICATIONS

Boo, Christian, U.S. Appl. No. 17/556,146 entitled "Wedge-shaped Tongue Groove," filed Dec. 20, 2021.
Rydsjö, Oscar, U.S. Appl. No. 17/665,160 entitled "Mounting Bracket," filed Feb. 4, 2022.
Meijer, U.S. Appl. No. 17/847,655 entitled "Panels Comprising a Mechanical Locking Device and an Associated Assembled Article", filed Jun. 23, 2022.
Håkansson et al., U.S. Appl. No. 17/869,911 entitled "Mechanical Locking System for Building Panels", filed Jul. 21, 2022.

* cited by examiner

RAIL FOR CABINETS

CROSS REFERENCE TO RELATED APPLICATIONS

The present application claims the benefit of Swedish Application No. 2051447-7, filed on Dec. 11, 2020. The entire contents of Swedish Application No. 2051447-7 are hereby incorporated herein by reference in their entirety.

TECHNICAL FIELD

Embodiments of the present invention relate to a locking rail for locking of a first and a second panel in a horizontal position. The locking rail may be a furniture component.

The first and second panel may be a side panel of a furniture, for a cabinet. The cabinet may be a kitchen or bathroom cabinet for a sink or a stovetop.

TECHNICAL BACKGROUND

Furniture products comprising panels to be locked together are known in the art. Furniture components for, e.g., kitchen or bathroom cabinets, suitable for the mounting of a sink or a stovetop in the cabinet, earlier described comprise a first and a second panel connected by a smaller panel that leaves an opening in the top of the cabinet, or a locking rail to be connected to the first and second panel using, e.g., screws.

The above description of various known aspects is the applicant's characterization of such, and is not an admission that any of the above description is considered as prior art.

Embodiments of the present invention address a need to provide locking rails that may be used for locking of a first and a second panel without using any tools, and which locking rails may be easily manufactured.

SUMMARY

It is an object of at least certain embodiments and aspects of the present invention to provide an improvement over the above described techniques and known art; particularly, to achieve a locking rail that could easily be connected to the panels of a cabinet for the locking of the panels in a horizontal direction while also giving a stable result.

A further object of at least certain aspects of the present invention is to facilitate the locking of panels in a position using a locking rail that is easy to manufacture and to use.

A further object of at least certain aspects of the present invention is to facilitate the connecting of a locking rail to a panel, which locking rail is easy to use and install and which reduces the risk of incorrect installation thereof.

At least some of these and other objects and advantages that will be apparent from the description have been achieved by a locking rail for locking of a first and a second panel in a horizontal position, wherein said first and second panel each comprises an essentially vertical panel surface and an essentially horizontal edge surface, the locking rail comprises a first and a second locking device which are configured to engage the horizontal edge surface of the first and the second panel, respectively, and an interconnecting extension which extends between said first and second locking device, the first and second locking device each comprises a first locking tongue which extends essentially perpendicular to the interconnecting extension, wherein the first locking tongue of the first locking device is configured for locking of the first panel in a first horizontal direction and the first locking tongue of the second locking device is configured for locking of the second panel in the first horizontal direction, and a first locking part which extends essentially perpendicular to the interconnecting extension.

According to an aspect the first locking part comprises a second locking tongue for locking of the locking rail in a vertical direction and relative the horizontal edge surface.

According to an aspect said second locking tongue extends at an angle from the first locking part.

According to an aspect the angle is within the range of about 5° to about 90°, preferably about 20° to about 45°, more preferably about 30°.

According to an aspect said second locking tongue comprises a first tongue surface and a second tongue surface.

According to an aspect an angle between said first tongue surface and second tongue surface is within the range of about 45° to about 135°, preferably about 90°.

According to an aspect said second locking tongue is configured to cooperate with a first locking groove in the panel surface for locking of the locking rail in a vertical direction.

According to an aspect said second tongue surface is configured to cooperate with the first locking groove.

According to an aspect an edge between the first tongue surface and the second tongue surface is configured to cooperate with the first locking groove.

According to an aspect said first locking tongue is configured to cooperate with a second locking groove in the horizontal edge surface for locking of the first and second panel, respectively, in the horizontal direction.

According to an aspect said first locking tongue is configured to cooperate with the second locking groove for locking of the locking rail in a second horizontal direction, which is essentially perpendicular to the first horizontal direction, respectively.

According to an aspect the locking rail is made in one piece.

According to an aspect the locking rail is made at least partly of metal, such as sheet metal.

According to an aspect the locking rail is made of sheet metal.

According to an aspect the first and second panel is a side panel of a furniture, for a cabinet.

According to an aspect the cabinet is a kitchen or bathroom cabinet for a sink or a stovetop.

According to a further aspect, provided is also a locking rail system comprising a locking rail and a locking receiving member, wherein the locking receiving member is adapted to be fastened to the first or second panel and to cooperate with the first locking part.

According to an aspect the core of the first panel and/or of the second panel may be a wood-based core, preferably made of MDF, HDF, OSB, WPC, plywood, or particleboard. The core may also be a plastic core comprising thermosetting plastic or thermoplastic, e.g., vinyl, PVC, PU, or PET. The plastic core may comprise fillers.

The first panel and/or the second panel may also be of solid wood.

The first panel and/or the second panel may be provided with a decorative layer, such as a foil or a veneer, on one or more surfaces.

BRIEF DESCRIPTION OF THE DRAWINGS

These and other aspects, features and advantages of which embodiments of the invention are capable of, will be apparent and elucidated from the following description of embodiments and aspects of the present invention, reference being made to the accompanying drawings, in which

In FIG. 17, the fronts of the cabinets are shown, while FIG. 18 show the cabinets seen from above. The first and the second panel of each cabinet is locked in a horizontal position using a locking rail according to an embodiment of the invention. The locking rails extends between, and engages, the upper horizontal edge surfaces of the first and the second panel of each cabinet close to the front of the cabinet.

DETAILED DESCRIPTION

Figure 1:
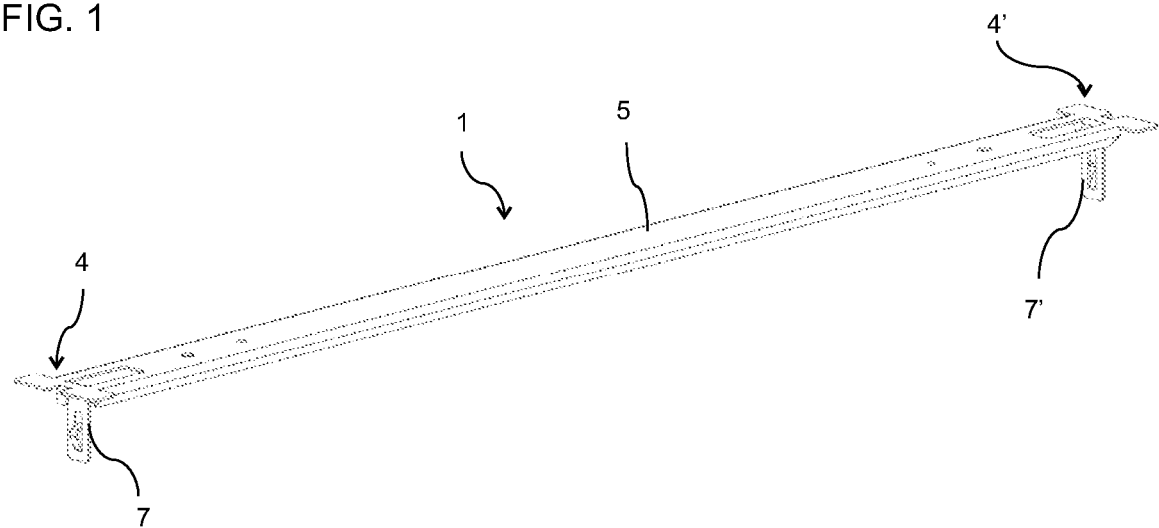
FIGS. 1-3 show different views of an embodiment of the locking rail according to an embodiment of the invention. The locking rail comprises a first and a second locking device and an interconnecting extension extending between said first and second locking device.
Figure 2:
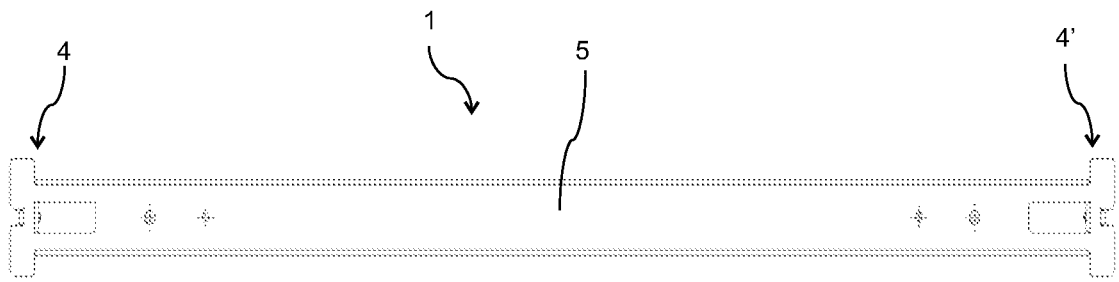
Figure 3:
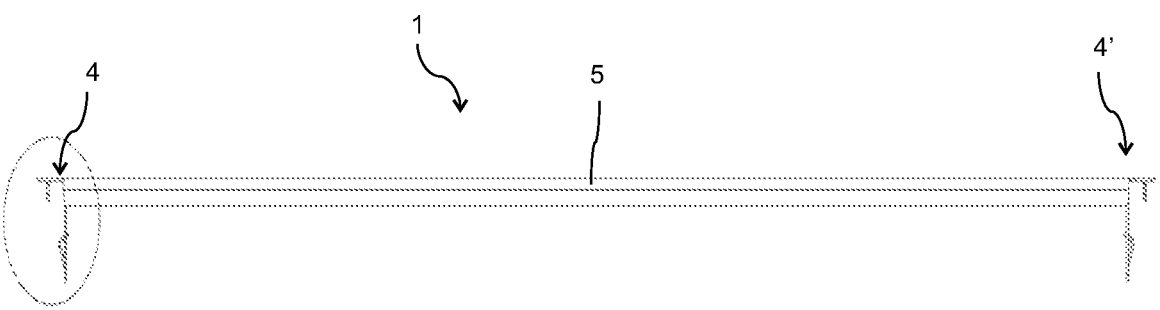

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example aspects may be implemented at least in part by means of both hardware and software, and that several "means", "units" or "devices" may be represented by the same item of hardware.

When the word "about" is used in this specification in connection with a numerical value, it is intended that the associated numerical value include a tolerance of +/− 10% around the stated numerical value.

The different aspects, alternatives and embodiments of the invention disclosed herein can be combined with one or more of the other aspects, alternatives and embodiments described herein. Two or more aspects can be combined.

An embodiment of the invention is shown, e.g., in FIGS. 1-5 including a locking rail 1 for locking of a first and a second panel 2,3 in a horizontal position. Said first and second panel 2,3 each comprises an essentially vertical panel surface and an essentially horizontal edge surface. The locking rail 1 comprises a first and a second locking device 4,4' which are configured to engage the horizontal edge surface of the first and the second panel 2,3, respectively. The locking rail 1 comprises an interconnecting extension 5 which extends between said first and second locking device 4,4'. The first and the second locking device 4,4' each comprises a first locking tongue 6,6' which extends essentially perpendicular to the interconnecting extension 5. The first locking tongue 6 of the first locking device 4 is configured for locking of the first panel 2 in a first horizontal direction D2. The first locking tongue 6' of the second locking device 4' is configured for locking of the second panel 3 in the first horizontal direction D2. The locking rail 1 further comprises a first locking part 7,7' which extends essentially perpendicular to the interconnecting extension 5.

Figure 4:
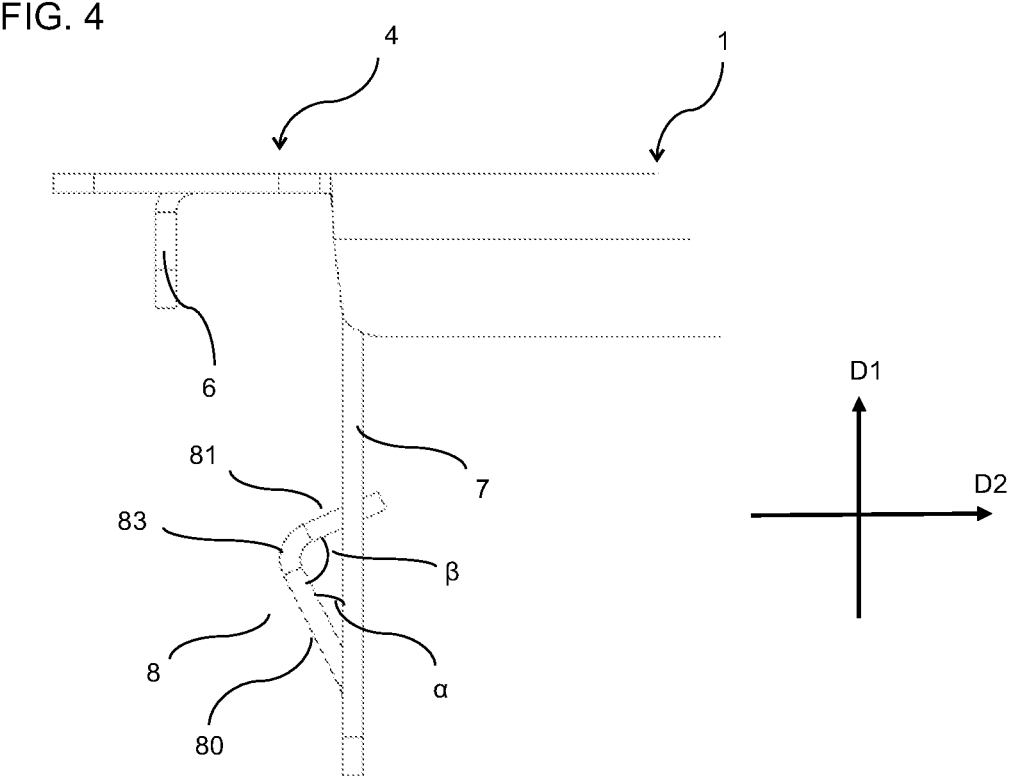
FIGS. 4-5 show enlargements of the first locking device, comprising a first locking tongue and a first locking part. The first locking part comprises a second locking tongue.
Figure 5:
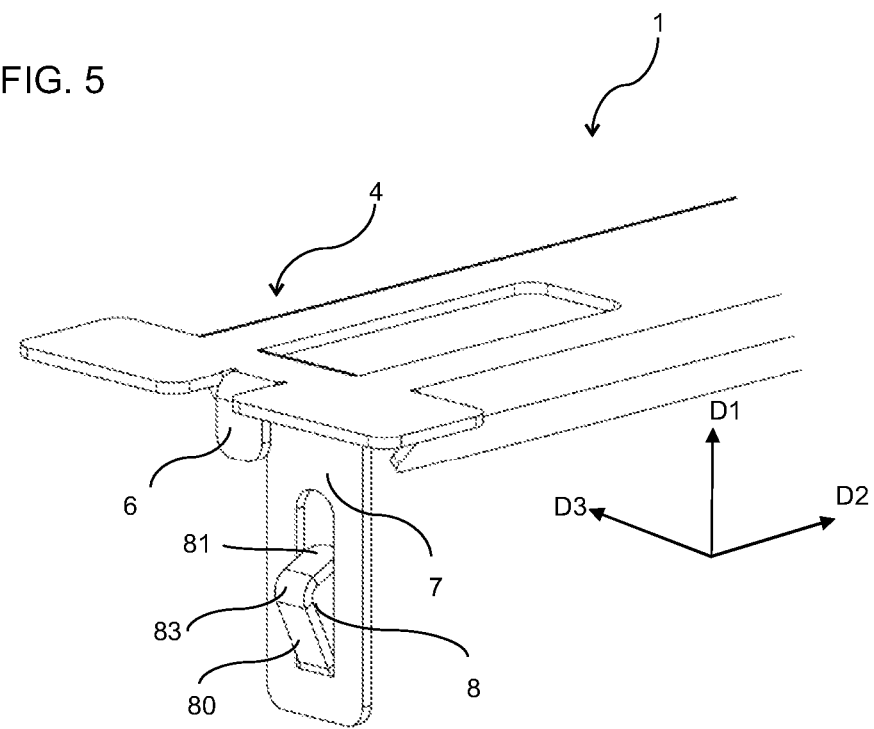

Details of the first locking device 4 and the first locking part 7 are shown in FIGS. 4-5. The second locking device 4' comprises the same components as the first locking device 4, but the components of the second locking device 4' are mirrored in relation to the components of the first locking device 4. The first locking part 7' comprises the same components as the first locking part 7, but the components of the first locking part 7' are mirrored in relation to the components of the first locking part 7.

The components of the first and the second panel 2,3 are also mirrored in relation to each other.

The first locking part 7,7' may comprise a second locking tongue 8,8' for locking of the locking rail 1 in a vertical direction D1 and relative the horizontal edge surface. The second locking tongue 8,8' may extend at an angle α,α' from the first locking part 7,7'. The angle α,α' may be within the range of about 5° to about 90°, preferably about 20° to about 45°, more preferably about 30°.

The first locking part 7,7' may be a part that is punch pressed and bended down from the interconnecting extension 5.

The second locking tongue 8,8' may comprise a first tongue surface 80,80' and a second tongue surface 81,81'. An angle β,β' between the first tongue surface 80,80' and the second tongue surface 81,81' may be within the range of about 45° to about 135°, preferably about 90°.

As shown in FIGS. 6-18, the locking rail 1 may engage with the first and the second panel 2,3.

Figure 14:
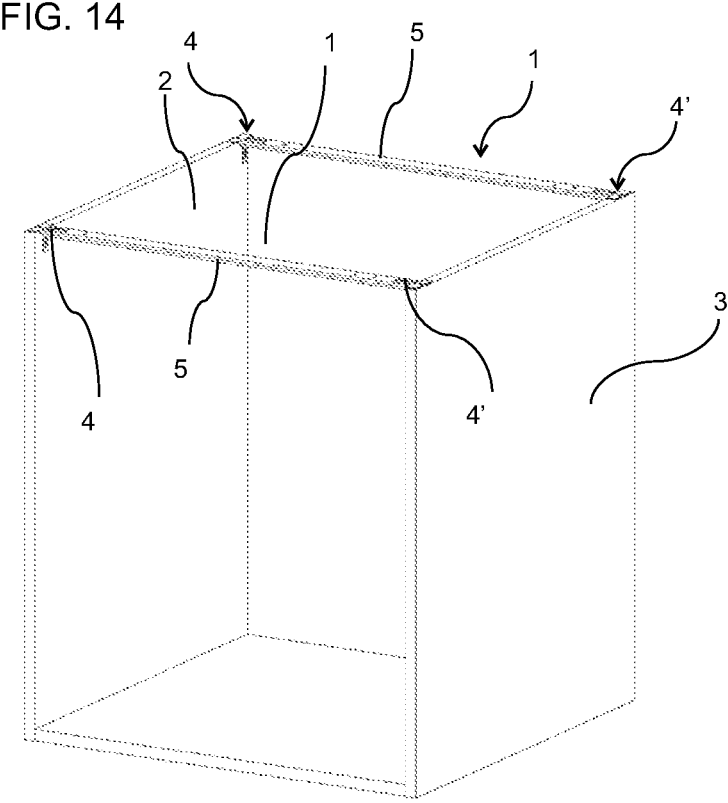
FIG. 14 shows a view of a cabinet having a first and a second panel, locked in a horizontal position using two locking rails according to an embodiment of the invention. The locking rails extends between, and engages, the upper horizontal edge surfaces of the first and the second panel, one locking rail locking the first and second panel in a horizontal position close to the front of the cabinet and one locking rail locking the first and second panel in a horizontal position close to the back of the cabinet.
Figure 15:
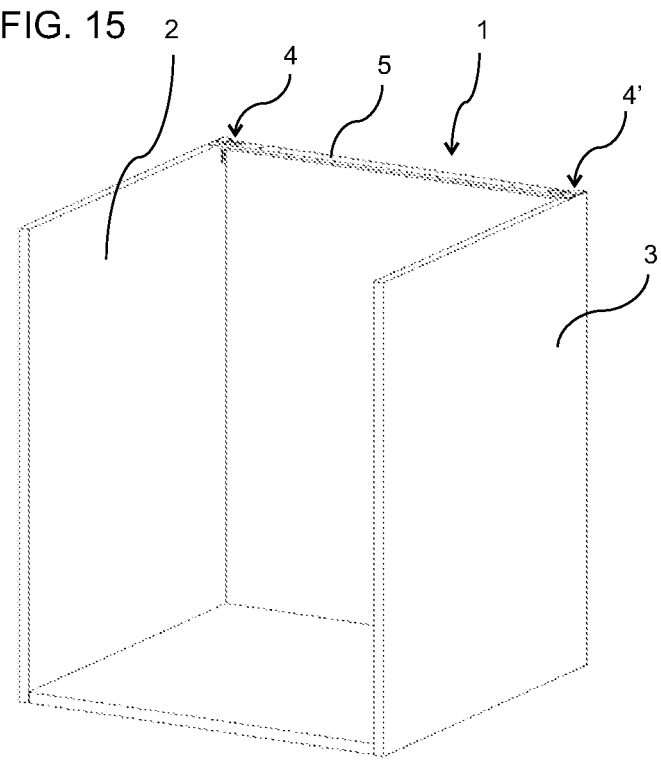
FIG. 15 shows a view of a cabinet having a first and a second panel, locked in a horizontal position using one locking rail according to an embodiment of the invention. The locking rail extends between, and engages, the upper horizontal edge surfaces of the first and second panel close to the back of the cabinet.
Figure 16:
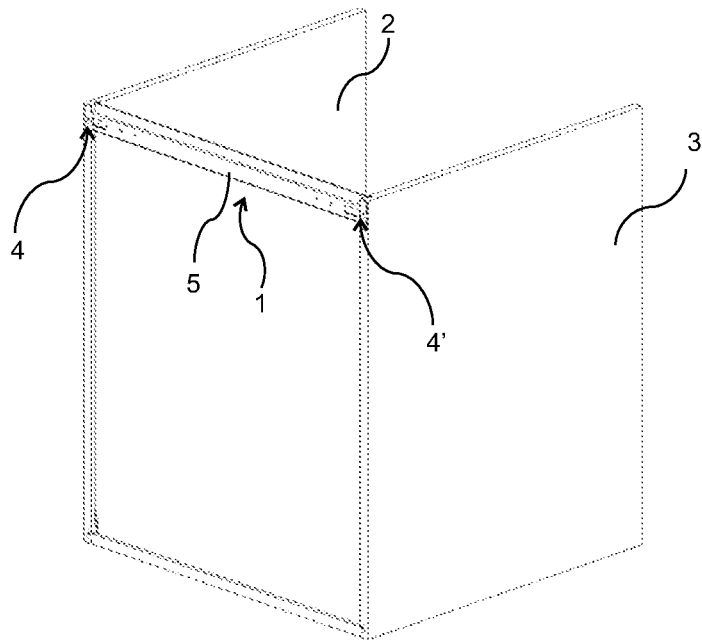
FIG. 16 shows a view of the back of a cabinet having a first and a second panel, locked in a horizontal position using one locking rail according to an embodiment of the invention. The locking rail extends between, and engages, the vertical edge surface of the first and second panel at the upper back of the cabinet.

In FIGS. 6-7 and 14-15 it is shown that the locking rail 1 is positioned on, and locks to, a horizontal edge surface on top of the first and second panel 2,3 of the cabinet, while in FIG. 16, the locking rail 1 is positioned at a horizontal edge surface at the upper back of the first and second panel 2,3 behind the cabinet.

Figure 6:
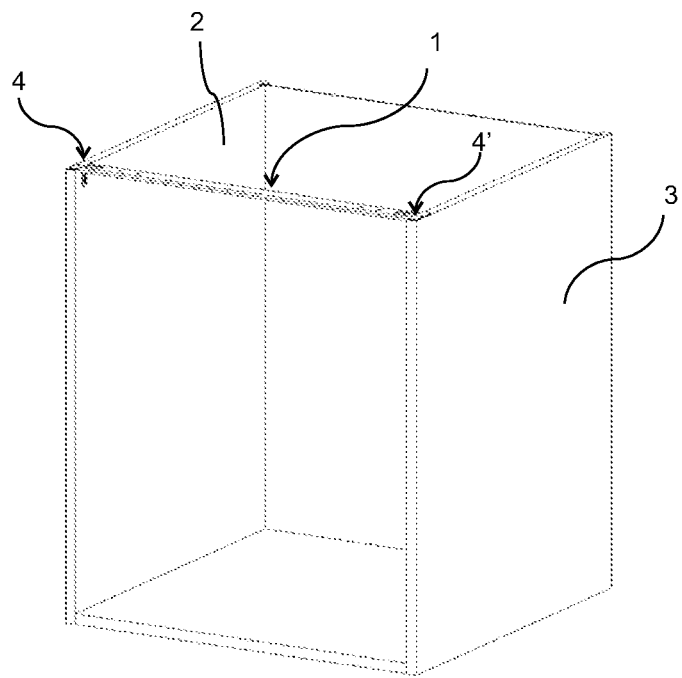
FIGS. 6-7 show different views of a cabinet having a first and a second panel, locked in a horizontal position using a locking rail according to an embodiment of the invention. The locking rail extends between, and engages, the horizontal edge surface of the first and the second panel.
Figure 7:
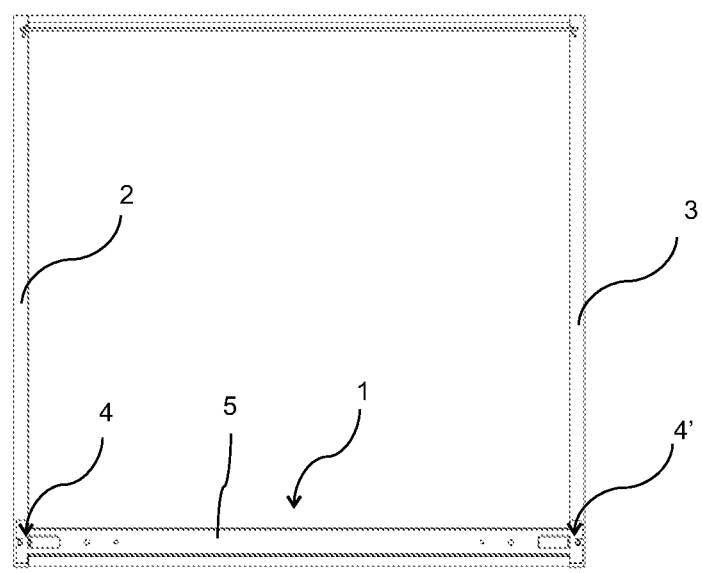

As shown in, e.g., FIGS. 6 and 15, the locking rail 1 may lock to the horizontal edge surface on top of the first and second panel 2,3 of the cabinet close to the front of or close to the back of the cabinet.

FIG. 14 shows how two locking rails 1 may be used for locking of the first and second panel 2,3 in the horizontal position, one locking rail locking the first and second panel 2,3 in a horizontal position close to the front of the cabinet and one locking rail locking the first and second panel 2,3 in a horizontal position close to the back of the cabinet.

The second locking tongue 8,8' may be configured to cooperate with a first locking groove 9,9' in the panel surface for locking of the locking rail 1 in a vertical direction D1.

The second tongue surface 81,81' may be configured to cooperate with the first locking groove 9,9', for example with an upper edge thereof. This results in a good locking in the vertical direction D1.

An edge 83,83' between the first tongue surface 80,80' and the second tongue surface 81,81' is configured to cooperate with the first locking groove 9,9'.

The first locking tongue 6,6' may be configured to cooperate with a second locking groove 10,10' in the horizontal edge surface for locking of the first and second panel 2,3, respectively, in the first horizontal direction D2. This gives an increased stability to the first and second panel 2,3 of the cabinet when in a locked position.

The first locking tongue 6,6' may be configured to cooperate with the second locking groove 10,10' for locking of the locking rail 1 in a second horizontal direction D3. The second horizontal direction is essentially perpendicular to the first horizontal direction D2. Thus, after locking, the locking rail 1 is locked in three directions, D1, D2 and D3, giving a very stable locking of the first and second panel 2,3.

Figure 8:
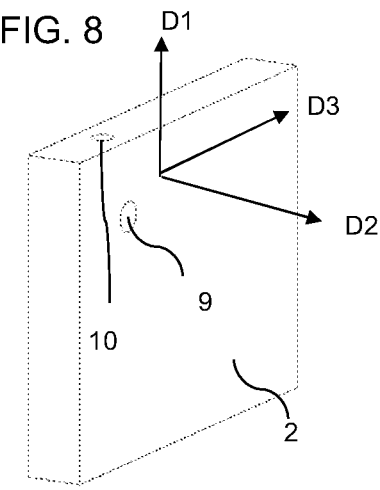
FIG. 8 shows a first panel having a first and a second locking groove according to an embodiment of the invention.
Figure 9:
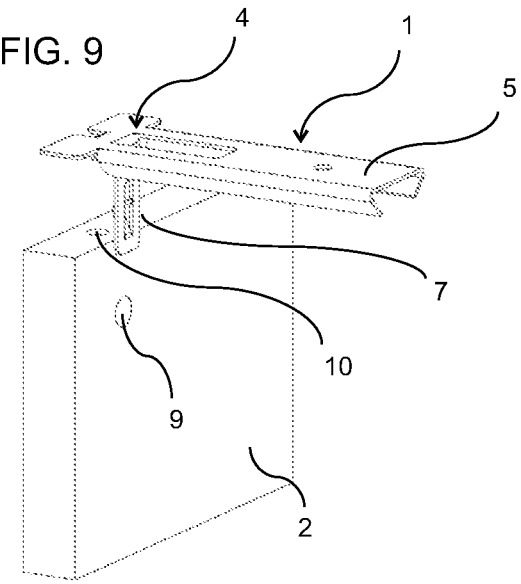
FIGS. 9-10 show a locking rail and a first panel in a non-locked and a locked position according to an embodiment of the invention. The locking rail comprises a first locking device comprising a first locking tongue. The first locking tongue cooperates with the second locking groove in the first panel. The first locking part of the locking rail comprises a second locking tongue cooperating with the first locking groove of the first panel.
Figure 10:
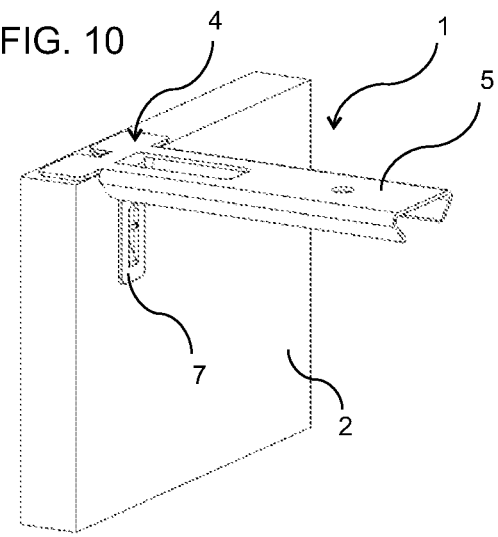
Figure 11:
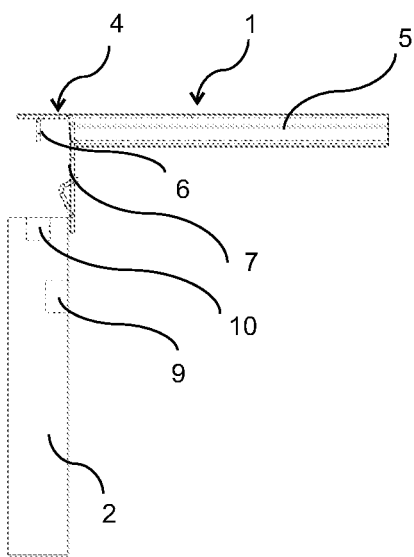
FIGS. 11-13 show a side-view of a locking rail and a first panel in a non-locked and a locked position according to an embodiment of the invention. The locking rail comprises a first locking device comprising a first locking tongue. The first locking tongue cooperates with the second locking groove in the first panel. The first locking part of the locking rail comprises a second locking tongue cooperating with the first locking groove of the first panel.
Figure 12:
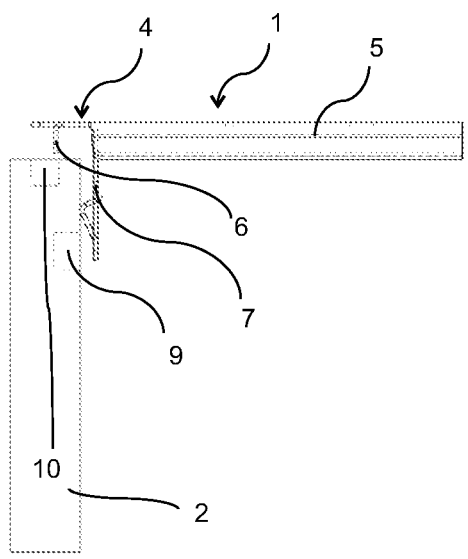
Figure 13:
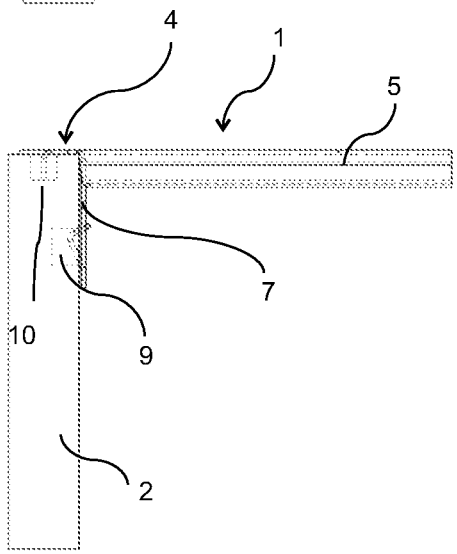

FIG. 8 shows a first panel 2 according to one embodiment before locking.

FIGS. 9-13 show a first panel 2 and a locking rail 1 according to one embodiment before, during and after locking of the locking rail 1 to the first panel 2.

Figure 17:
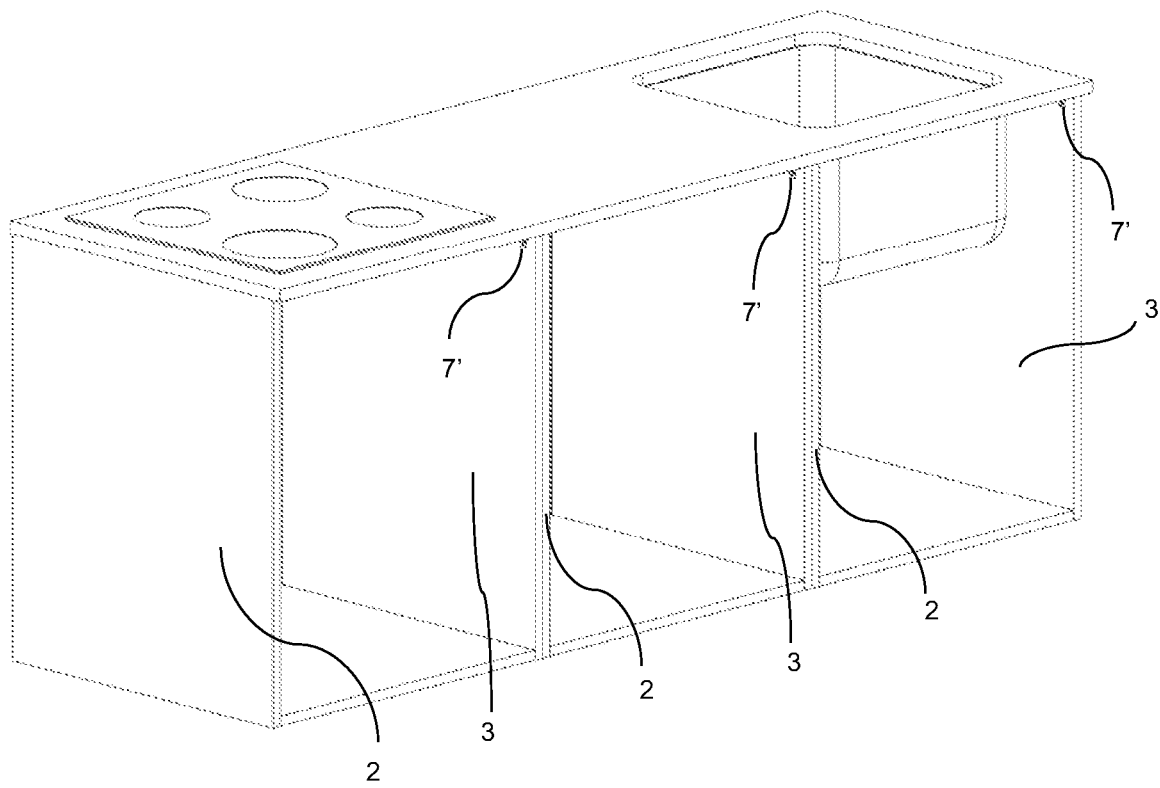
FIGS. 17 and 18 show different views of three kitchen cabinets positioned next to each other.
Figure 18:
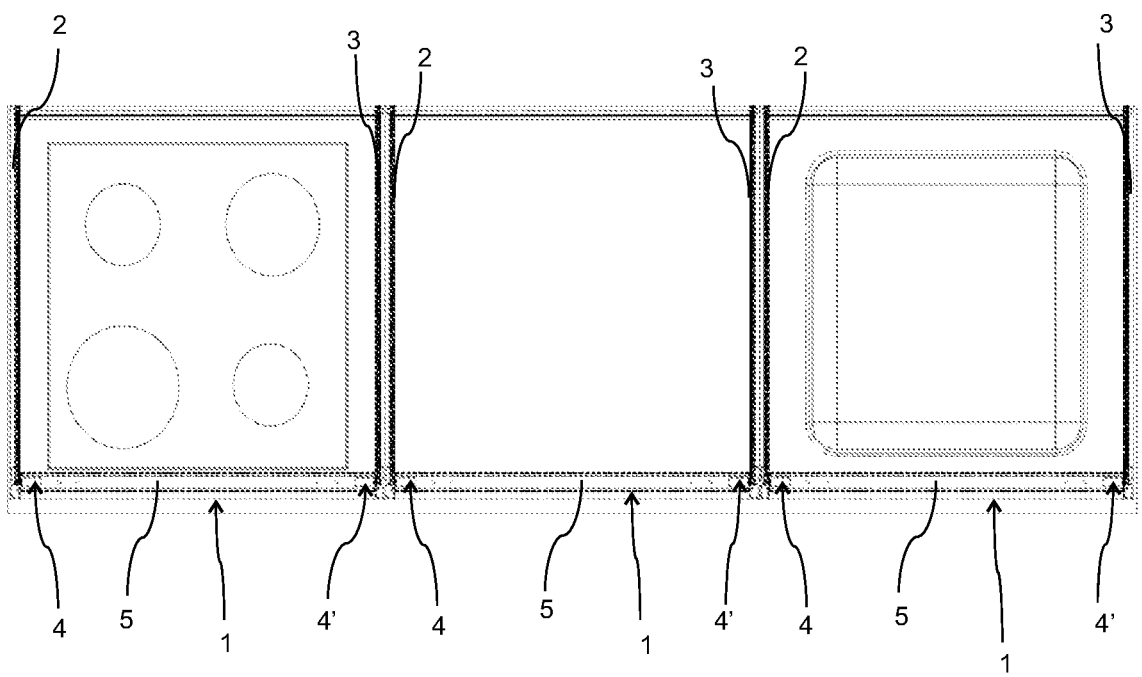
Figure 19:
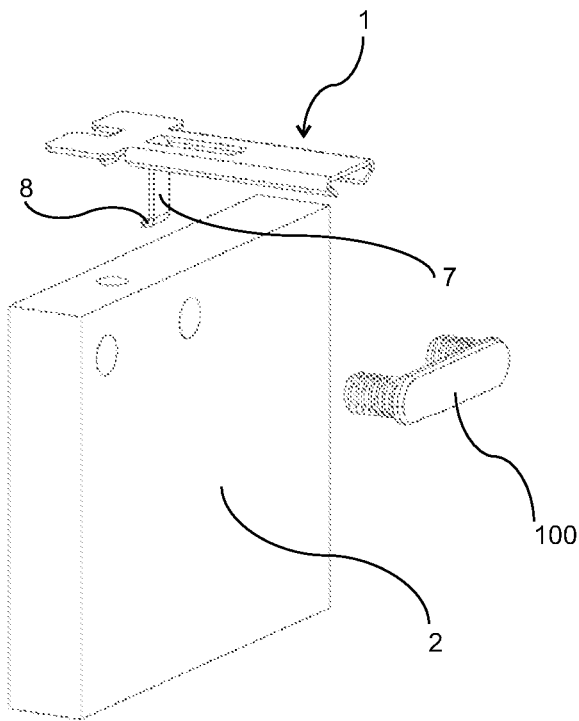
FIGS. 19-22 show view of two different embodiments of locking rail systems comprising a locking rail and a locking receiving member. The locking receiving member is fastened to the first or second panel (2,3) and cooperates with the first locking part for locking of the first and second panel in a horizontal position.
Figure 20:
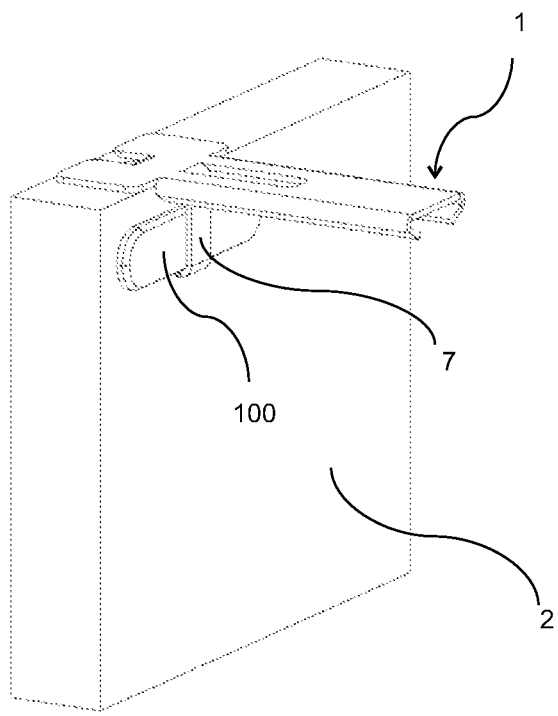
Figure 21:
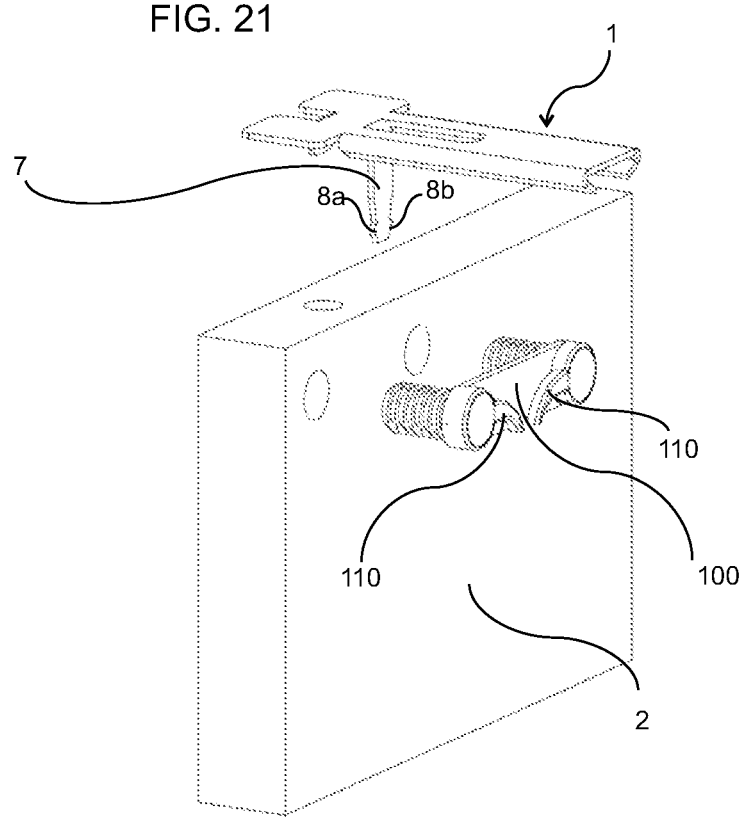
Figure 22:
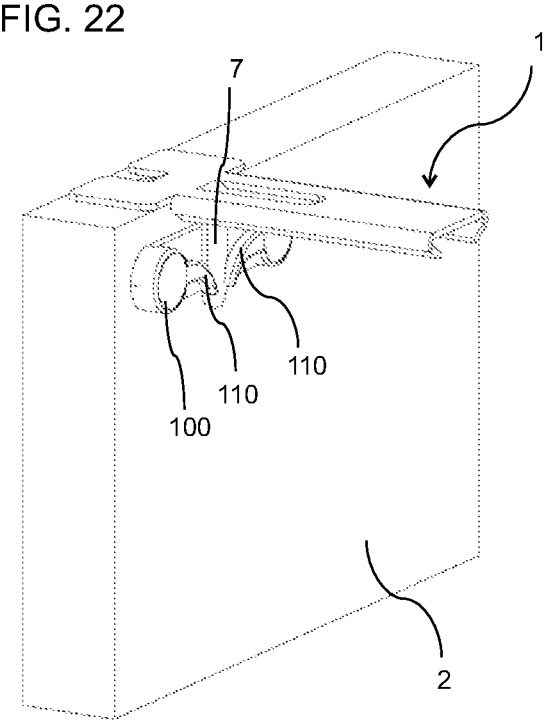

FIGS. 17 and 18 show a set of three kitchen cabinets, where the first and second panel 2,3 of each cabinet are locked in a horizontal position using a locking rail 1 according to one embodiment of the invention. This enables the quick and easy assembly of a kitchen comprising a sink and/or stove without the need to, e.g., saw out a hole in the top of the cabinet for the mounting of the stove or sink, without the need of any tools and still obtaining a good stability of the cabinet.

As shown in FIGS. 19-22, an aspect of the present invention relates to a locking rail system comprising a locking rail 1 and a locking receiving member 100, where different alternatives of the locking receiving member 100 are shown in FIGS. 19-20 and 21-22, respectively. The locking receiving member 100 may be adapted to be fastened to the first or second panel 2,3 and to cooperate with the first locking part 7,7' of the locking rail 1 for locking of the first and second panel 2,3 in a horizontal position.

According to one embodiment, the second locking tongue 8,8' may be configured as a bent end edge of the first locking part 7,7' of the locking rail 1. See the first locking part 7 in FIGS. 19-20. The second locking tongue 8,8' can cooperate with a first locking groove 9,9' in the panel surface for locking of the locking rail 1 in a vertical direction D1. Alternatively, the second locking tongue 8,8' can cooperate with the locking receiving member 100 for locking of the locking rail 1 in a vertical direction D1.

According to one embodiment, the second locking tongue 8,8' may be configured on one or both sides of the first locking part 7,7' of the locking rail 1. See the first locking part 7 in FIG. 21-22 with second locking tongues 8a,8b on each side of the first locking part 7. According to an aspect the locking receiving member 100 comprises one or two locking arms 110 adapted to cooperate with the second locking tongues 8a,8b,8a',8b' of the first locking part 7,7'. A locking arm 110 may be flexible and is configured to displace as a second locking tongue 8a,8b,8a',8b' of the first locking part 7,7' is pushed past the locking arm 110. An end of the locking arm 110 is configured to cooperate with second locking tongue 8a,8b,8a',8b' for locking the locking rail 1 in a vertical direction D1.

The locking rail 1 may be made in one piece.

The locking rail 1 may be made at least partly of metal, such as sheet metal.

The locking rail 1 may be made of sheet metal.

The first and second panel 2,3 may be a side panel of a furniture, for a cabinet. The cabinet may be a kitchen or bathroom cabinet for a sink or a stovetop.

The core of the first and second panel 2,3 may be a wood-based core, preferably made of MDF, HDF, OSB, WPC, plywood, or particleboard. The core may also be a plastic core comprising thermosetting plastic or thermoplastic, e.g., vinyl, PVC, PU, or PET. The plastic core may comprise fillers. The first and second panel 2,3 may also be of solid wood. The first and second panel 2,3 may be provided with a decorative layer, such as a foil or a veneer, on one or more surfaces.

Further embodiments of the invention are described below:

According to one embodiment the present invention relates to a locking rail 1 for locking of a first and a second panel 2,3 in a horizontal position. Said first and second panel 2,3 each comprises an essentially vertical panel surface and an essentially vertical edge surface. The locking rail 1 comprises a first and a second locking device 4,4' which are configured to engage the vertical edge surface of the first and the second panel 2,3, respectively. The locking rail 1 comprises an interconnecting extension 5 which extends between said first and second locking device 4,4'. The first and the second locking device 4,4' each comprises a first locking tongue 6,6' which extends essentially perpendicular to the interconnecting extension 5. The first locking tongue 6 of the first locking device 4 is configured for locking of the first panel 2 in a first horizontal direction D2. The first locking tongue 6' of the second locking device 4' is configured for locking of the second panel 3 in the first horizontal direction D2. The locking rail 1 further comprises a first locking part 7,7' which extends essentially perpendicular to the interconnecting extension 5.

According to an aspect the first locking part 7,7' comprises a second locking tongue 8,8' for locking of the locking rail 1 in a vertical direction D1 and relative the vertical edge surface.

According to an aspect said second locking tongue 8,8' extends at an angle α,α' from the first locking part 7,7'.

According to an aspect the angle α,α' is within the range of about 5° to about 90°, preferably about 20° to about 45°, more preferably about 30°.

According to an aspect said second locking tongue 8,8' comprises a first tongue surface 80,80' and a second tongue surface 81,81'.

According to an aspect an angle β,β' between said first tongue surface 80,80' and second tongue surface 81,81' is within the range of about 45° to about 135°, preferably about 90°.

According to an aspect said second locking tongue 8,8' is configured to cooperate with a first locking groove 9,9' in the panel surface for locking of the locking rail 1 in a vertical direction D1.

According to an aspect said second tongue surface 81,81' is configured to cooperate with the first locking groove 9,9'.

According to an aspect an edge 83,83' between the first tongue surface 80,80' and the second tongue surface 81,81' is configured to cooperate with the first locking groove 9,9'.

According to an aspect said first locking tongue 6,6' is configured to cooperate with a second locking groove 10,10' in the vertical edge surface for locking of the first and second panel 2,3, respectively, in the first horizontal direction D2.

According to an aspect said first locking tongue 6,6' is configured to cooperate with the second locking groove 10,10' for locking of the locking rail 1 in a second horizontal direction D3, which is essentially perpendicular to the first horizontal direction D2, respectively.

According to an aspect the locking rail 1 is made in one piece.

According to an aspect the locking rail is made at least partly of metal, such as sheet metal.

According to an aspect the locking rail 1 is made of sheet metal.

According to an aspect the first and second panel 2,3 is a side panel of a furniture, for a cabinet.

According to an aspect the cabinet is a kitchen or bathroom cabinet for a sink or a stovetop.

According to one embodiment the present invention relates to a locking rail system comprising a locking rail 1 according to the above and a locking receiving member 100, wherein the locking receiving member 100 is adapted to be fastened to the first or second panel 2,3 and to cooperate with the first locking part 7,7'.

According to an aspect the locking receiving member 100 comprises a locking arm 110 adapted to cooperate with the first locking part 7,7'.

According to an aspect the locking receiving member 100 comprises two locking arms 110 adapted to cooperate with the first locking part 7,7'.

The invention claimed is:

1. A locking rail for locking of a first and a second panel in a horizontal position, wherein said first and second panel each comprises an essentially vertical panel surface and an essentially horizontal edge surface, the locking rail comprises a first and a second locking device which are configured to engage the horizontal edge surface of the first and the second panel, respectively, and an interconnecting extension which extends between said first and second locking device, the first and second locking device each comprises a first locking tongue which extends essentially perpendicular to the interconnecting extension,
    wherein the first locking tongue of the first locking device is configured for locking of the first panel in a first horizontal direction and the first locking tongue of the second locking device is configured for locking of the second panel in the first horizontal direction, and a first locking part which extends essentially perpendicular to the interconnecting extension,
    wherein the first locking part comprises a second locking tongue for locking of the locking rail in a vertical direction and relative the horizontal edge surface.

2. The locking rail as claimed in claim 1, wherein said second locking tongue extends at an angle from the first locking part.

3. The locking rail as claimed in claim 2, wherein the angle is within the range of about 5° to about 90°.

4. The locking rail as claimed in claim 1, wherein said second locking tongue comprises a first tongue surface and a second tongue surface.

5. The locking rail as claimed in claim 4, wherein an angle between said first tongue surface and second tongue surface is within the range of about 45° to about 135°.

6. The locking rail as claimed in claim 1, wherein said second locking tongue is configured to cooperate with a first locking groove in the panel surface for locking of the locking rail in a vertical direction.

7. The locking rail as claimed in claim 6, wherein said second tongue surface is configured to cooperate with the first locking groove.

8. The locking rail as claimed in claim 6, wherein an edge between the first tongue surface and the second tongue surface is configured to cooperate with the first locking groove.

9. The locking rail as claimed in claim 1, wherein said first locking tongue is configured to cooperate with a second locking groove in the horizontal edge surface for locking of the first and second panel, respectively, in the horizontal direction.

10. The locking rail as claimed in claim 9, wherein said first locking tongue is configured to cooperate with the second locking groove for locking of the locking rail in a second horizontal direction, which is essentially perpendicular to the first horizontal direction, respectively.

11. The locking rail as claimed in claim 1, wherein the locking rail is made in one piece.

12. The locking rail as claimed in claim 1, wherein the locking rail is made of sheet metal.

13. The locking rail as claimed in claim 1, wherein the first and second panel is a side panel of a furniture, for a cabinet.

14. The locking rail as claimed in claim 13, wherein the cabinet is a kitchen or bathroom cabinet for a sink or a stovetop.

15. A locking rail system comprising a locking rail according to claim 1, and a locking receiving member, wherein the locking receiving member is adapted to be fastened to the first or second panel and to cooperate with the first locking part.

\* \* \* \* \*